United States Patent
Ossman et al.

(10) Patent No.: US 7,545,519 B2
(45) Date of Patent: Jun. 9, 2009

(54) LEAD EDGE SHEET CURL SENSOR

(75) Inventors: Kenneth R. Ossman, Macedon, NY (US); Stanley J. Wallace, Victor, NY (US); Michael D. Borton, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 189 days.

(21) Appl. No.: 11/490,692

(22) Filed: Jul. 20, 2006

(65) Prior Publication Data

US 2008/0018913 A1  Jan. 24, 2008

(51) Int. Cl.
G01B 11/14 (2006.01)
(52) U.S. Cl. .................................... 356/625
(58) Field of Classification Search ............. 356/71, 356/406, 625; 250/223 R, 559.36
See application file for complete search history.

(56) References Cited

U.S. PATENT DOCUMENTS

| | | | | |
|---|---|---|---|---|
| 2,735,331 A * | 2/1956 | McMaster et al. | ........... | 356/600 |
| 4,077,519 A | 3/1978 | Huber | ........... | 209/74 R |
| 4,627,718 A | 12/1986 | Wyer | ........... | 355/35 H |
| 5,270,778 A * | 12/1993 | Wyer | ........... | 399/406 |
| 5,751,443 A | 5/1998 | Borton et al. | ........... | 356/446 |
| 6,215,553 B1 * | 4/2001 | Rider et al. | ........... | 356/630 |
| 6,242,733 B1 * | 6/2001 | Ma et al. | ........... | 250/223 R |
| 6,437,357 B1 * | 8/2002 | Weiss et al. | ........... | 250/559.4 |
| 6,486,464 B1 * | 11/2002 | Ma et al. | ........... | 250/223 R |
| 6,668,155 B1 | 12/2003 | Hubble, III et al. | ........... | 399/406 |

* cited by examiner

*Primary Examiner*—Tarifur R. Chowdhury
*Assistant Examiner*—Isiaka O Akanbi
(74) *Attorney, Agent, or Firm*—Kermit D. Lopez; Luis M. Ortiz; William B. Shelby

(57) ABSTRACT

A lead edge sheet curl sensor apparatus and method are disclosed. In general, a first and a second light emitter are aligned wherein the light beams from the first light emitter and second light emitter cross. The first and second light emitter beams cross at the transport media sheet substrate path wherein the transport media sheet substrate path is the path of a media sheet substrate with zero curl. First and second light detectors are aligned to receive the light beams from the first and second light emitters. A media sheet substrate with either positive or negative curl on the lead edge of the sheet substrate interrupts light beams from first and second light emitters, as detected at first and second light detectors. The time delay between the light beam interruptions is proportional to the sheet substrate curl, and the order of interruptions indicates whether the sheet substrate curl is positive or negative.

20 Claims, 5 Drawing Sheets

LEAD EDGE SHEET CURL SENSOR

TECHNICAL FIELD

Embodiments are generally related to electrophotographic printing machines. Embodiments are also related to the field of sheet substrate curl detection sensors in printers and electrophotographic printers.

BACKGROUND

The curling of print media sheets is a particular problem in the printing industry. It is exacerbated by high-density images and plural color printing. However, sheet curling can occur even for unprinted sheets of paper with changes in the ambient humidity or moisture content of the paper. Sheet curl can interfere with proper sheet feeding, causing sheet feeding jams or delays. If sheet curl is present in the output, it can interfere with proper stacking or other finishing operations of the sheets. For example, if printed sheets with curl do not lie flat when stacked together in sets, such as in the pages of booklets, an objectionable distortion of the booklet may result.

Furthermore, the amount of moisture in the sheet of paper can drastically change from the printing process itself, to cause or exacerbate curl. In particular, from water-based ink jet printing or the thermal fusing operation for toners in xerographic printing, and particular from high density image printing near the edges of the sheet. There is a further sheet curl problem in duplex printing, where the sheets are re-fed or recirculated for printing imaging material on their second sides, especially if that involves a second pass of the sheet through a thermal fuser and/or higher density images on one side than the other.

Various paper curl sensors and control apparatus are known in the electrophotographic printing arts. One example is disclosed U.S. Pat. No. 6,668,155, entitled "Lead Edge Paper Curl Sensor," which issued to Hubble, III, et al. on Dec. 23, 2003 and is assigned to the Xerox Corporation of Stamford, Conn. U.S. Pat. No. 6,668,155, which is incorporated herein by reference in its entirety discloses a sheet curl sensor that remotely senses sheet curl without contacting or interfering with the motion of the sheets in their normal sheet path. This sensor operates on a portion of the moving sheet at an angle thereto and perpendicular thereto, with displacement insensitive optics, in both an angular direction substantially parallel to the sheet movement direction and an angular direction substantially transverse to the sheet movement direction, with ratioing of the two input signals. The sheet curl sensor of U.S. Pat. No. 6,668,155 teaches a sensor comprising two sheet illuminators, a first sheet illuminator mounted to illuminate a portion of the moving sheet at an angle in a direction substantially parallel to the sheet movement direction, a second sheet illuminator mounted to illuminate a portion of the moving sheet at an angle in a direction substantially transverse to the sheet movement direction, and a photodetector system positioned to sense the illumination of the moving sheet by both the first and second sheet illuminators as the illumination is reflected approximately perpendicularly from the illuminated portion of the moving sheet and to provide variable control output signals in response to the sensed reflected illumination levels.

In such a sheet curl sensor, the variable output control signals in response to the sensed illumination are a ratio of the output control signals from the photodetector system produced by the first and second illuminators. The ratio of the output signals from the photodetector system is then proportional to the amount of the paper curl sensed.

Another example of a paper curl sensor is disclosed in U.S. Pat. No. 5,270,778, entitled "Sheet Curl Control Apparatus," which issued to Andrew Wyer on Dec. 14, 1993 and is assigned to the Xerox Corporation of Stamford, Conn. U.S. Pat. No. 5,270,778, which is incorporated herein by reference in its entirety, discloses a sheet curl sensor comprising a radiation source, in the form of an infra-red emitter and two detectors in the form of infra-red sensors. The sensors are spaced apart adjacent a horizontal section of sheet path and are arranged whereby movement of the sheet material along the sheet path causes the infra-red light beams to be interrupted in succession by the lead edge of the sheet material. The time interval between interruptions of the infra-red light beams at the sensors is a function of the sheet curl.

U.S. Pat. No. 5,751,443, entitled "Adaptive Sensor and Interface," which issued to Borton et al on May 12, 1998 and assigned to the Xerox Corporation is an example of a precise lead edge sensing system. U.S. Pat. No. 5,751,443, which is incorporated herein by reference in its entirety, discloses a sensor which detects the presence of paper and transparencies in a sheet transporting path and includes a light source disposed near the transporting path for projecting light toward a reflector on the opposite side of the transporting path and a light detector located relative to the light source to receive light emitted by the light source and reflected b the reflector so that by such positioning the light path is interrupted by substrates passing through the transport path. The output signal of the light detector is proportional to the light received across the transport path. A control, electrically connected to the sensor, adjusts flux incident on the light detector to maintain the collector current in the linear portion of the light detector's operating range. The sensor is tilted at an angle with respect to the horizontal of a copy substrate to be able to detect transparencies.

One problem encountered by prior art sheet curl sensors, is the maximum resolution of the sensor. Expensive and complicated solutions have been used to measure the height of the curl to a resolution of less that 0.01 mm. Disclosed in the current embodiment is an improved sheet curl sensor for inexpensively measuring the amount of curl of an edge of a print media moving through a printer or xerographic printer. The disclosed sheet curl sensor can inexpensively measure sheet curl heights to less than 0.01 mm of sheet curl.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved lead edge sheet curl sensor and method.

It is another aspect of the present invention to provide for a lead edge sheet curl sensor capable of measuring sheet curl to less than 0.01 mm resolution.

The aforementioned aspects and other objectives and advantages can now be achieved as described herein. A lead edge sheet curl sensor apparatus is disclosed, including a system and method thereof. In general, a first and a second light emitter are aligned wherein the light beams from the first light emitter and second light emitter cross. The first and second light emitter beams cross at the transport media sheet substrate path wherein the transport media sheet substrate path is the path of a media sheet substrate with zero curl. First and second light detectors are aligned to receive the light beams from the first and second light emitters. A media sheet substrate with either positive or negative curl on the lead edge of the sheet substrate interrupts light beams from first and second light emitters, as detected at first and second light detectors; the time delay between the light beam interruptions being proportional to sheet substrate curl and the order of interruptions indicating whether the sheet substrate curl is positive or negative.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
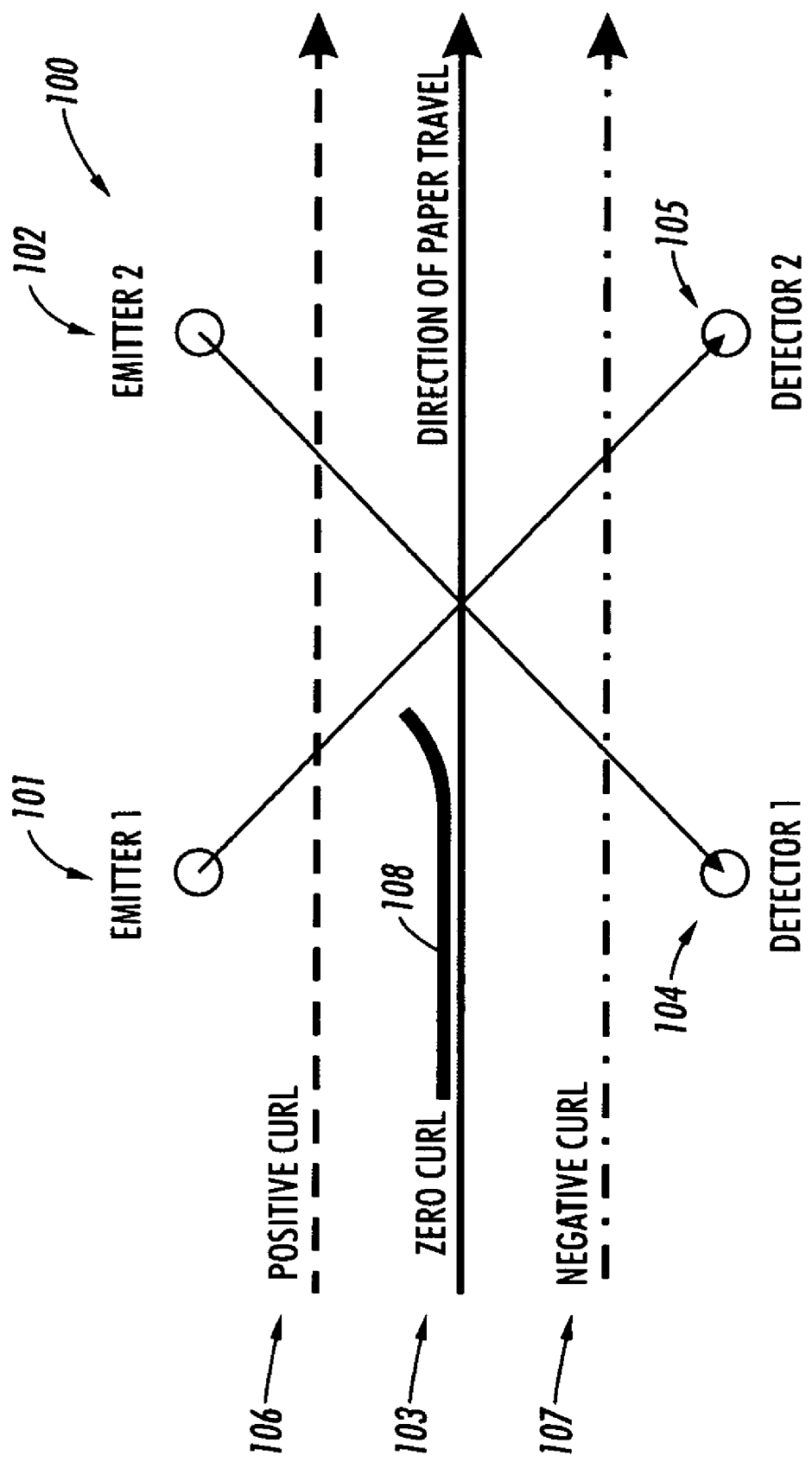
FIG. 1 illustrates a lead edge sheet curl sensor apparatus, which can be implemented in accordance with a preferred embodiment.

FIG. 1 illustrates a lead edge sheet curl sensor 100, which can be adapted for use in accordance with a preferred embodiment. In general, the lead edge sheet curl sensor 100 can be implemented in the context of measuring the leading edge position of a transport media substrate in a marking engine, such as paper or transparencies in a xerographic printer. As indicated in FIG. 1, two light emitters 101 and 102 can be disposed above a transport media path 103. Located below the transport media path 103 are two light detectors 104 and 105. Light emitter 101 can be aligned such that a light beam emitted from light emitter 101 is directed toward light detector 105. Light emitter 102 can be aligned such that an emitted light beam is directed toward light detector 104.

Light emitters 101 and 102 can be mounted such that the light beams from light emitters 101, 102 cross the ideal transport media path 103 at approximately an angle of 45 degrees, although, other crossing angles are possible in other embodiments. As shown in FIG. 1, light emitters 101 and 102 are mounted in lead edge paper curl sensor 100 so that the light beams cross each other at close to the ideal transport media path 103 and at an angle of approximately 90 degrees to each other, although, other crossing angles are possible in accordance with other embodiments. Relative to the transport media path, light emitter 101 can be mounted before light emitter 102 such that the media substrate 108 transported on the transport media path 103 passes below light emitter 101 first and passes below light emitter 102 secondly. Both light emitters 101 and 102 are positioned such that the media substrate 108 can pass through both light emitter beams as it transverses the sensor 100.

A positive curl associated with the media substrate 108 is indicated in FIG. 1 by arrow 106. The "positive curl", as defined by FIG. 1, can constitute any curl of the leading edge of the media substrate in the positive direction towards arrow 106. "Negative curl" is defined similarly in the negative direction and shown as arrow 107 in FIG. 1. Media substrate 108 is shown in FIG. 1 with a slight positive curl for illustrative purposes only.

The lead edge sheet curl sensor 100 operates by measuring any time difference between an interruption of the light beams from light emitters 101 and 102 as detected at the detectors 104 and 105. Media substrate 108 traveling on the ideal transport path 103 with zero curl of the leading edge will pass through the intersection of the beams from light emitters 101 and 102, interrupting the light beams sensed at the detectors 104 and 105 simultaneously. Media substrate 108 with a positive curl of the leading edge towards light emitters 101 and 102 will interrupt the light beam from light emitter 101 as sensed at detector 105 before the light beam from light emitter 102 is sensed at detector 104. Similarly, media substrate 108 with a negative leading edge curl away from the emitters 101 and 102 will interrupt the light beam from light emitter 102 as sensed at detector 104 before the light beam from light emitter 101 is sensed at detector 105. The amount of time elapsed between the two interruptions of the light beams as sensed at detectors 104 and 105 is generally the measure of media substrate 108 leading edge curl. The direction of the media substrate curl, either positive or negative, is indicated by order of the interruption of the light beams as detected at light detectors 104 and 105.

The output signals from the detectors 104 and 105 can be processed in a microprocessor such as that disclosed in U.S. Pat. No. 5,751,443 to Borton et al. The lead edge paper curl sensor 100 can utilize the known self calibration techniques of U.S. Pat. No. 5,751,443. The curl measurement resolution is a function of timer clock speed. Increased timer clock speeds will result in a higher curl measurement resolution and increased sensor sensitivity and precision. The present embodiment possesses a maximum curl resolution of less than 0.01 mm height of media substrate curl. One parameter that must be known and controlled is the media transport velocity. The timing of the interruption of the light beams at detectors 104 and 105 is directly proportional to the transport media velocity as the media substrate 108 transverses the lead edge paper curl sensor. Alternatively, if the length of the media substrate 108 is known, the media substrate velocity may be calculated utilizing the timing of the interruption of the light beam caused by the leading edge of the media substrate 108 and the resumption of light detection at either detector 104 or 105 after the trailing edge of the media substrate passes. It can be appreciated that the techniques and devices discussed in U.S. Pat. No. 5,751,443 are referenced herein for illustrative and edification purposes only and do not constitute limiting features of the disclosed embodiments. It can be appreciated that other types of calibration techniques can be adapted for use with alternative embodiments.

Figure 2:
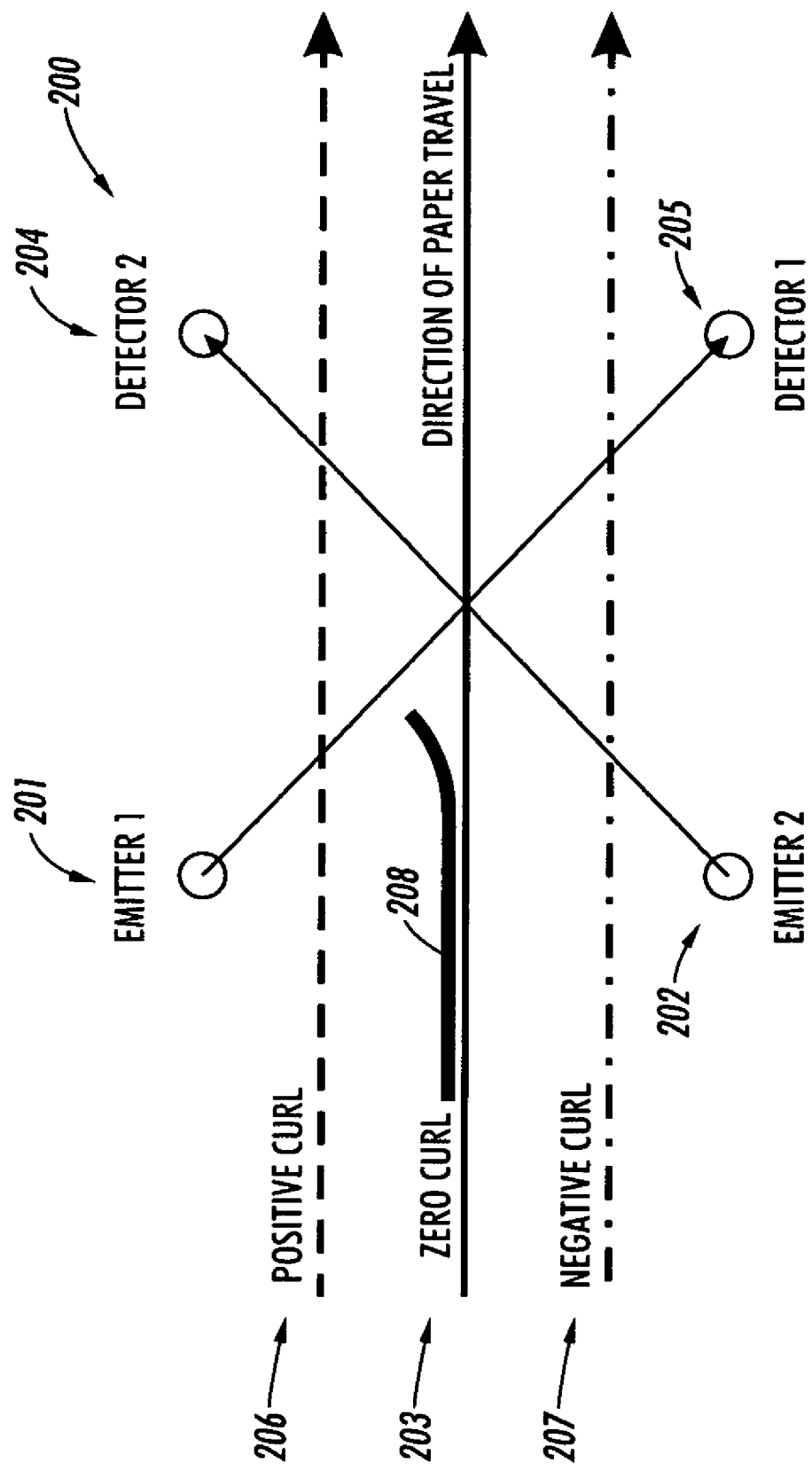
FIG. 2 illustrates a lead edge sheet curl sensor apparatus, which can be implemented in accordance with an alternative embodiment.

FIG. 2 illustrates an additional embodiment of a lead edge sheet curl sensor 200. As indicated in FIG. 2, lead edge sheet curl sensor 200 comprises two light emitters 201 and 202 disposed on opposite sides of the transport media path 203. Also disposed on opposite sides of the transport media path are two light detectors, 204 and 205. Light emitter 201 can be aligned such that a light beam emitted from light emitter 201 is directed toward light detector 205. Light emitter 202 can be aligned such that an emitted light beam is directed toward light detector 204.

Lead edge curl sensor 200 operates similarly to lead edge curl sensor 100. Light emitters 201 and 202 can be mounted such that the light beams from light emitters 201, 202 cross the ideal transport media path 203. As shown in FIG. 2, light emitters 201 and 202 are mounted in lead edge paper curl sensor 200 so that the light beams cross each other at close to the ideal transport media path 203 and at an angle of approximately 90 degrees to each other, although, other crossing angles are possible in accordance with other embodiments. Relative to the transport media path, light emitter 201 can be mounted above light emitter 202 such that the media substrate 208 transported on the transport media path 203 passes between light emitters 201 and 202. Both light emitters 201 and 202 are positioned such that the media substrate 208 can pass through both light emitter beams as it transverses the sensor 200.

A positive curl associated with the media substrate 208 is indicated in FIG. 2 by arrow 206. The "positive curl", as defined by FIG. 2, can constitute any curl of the leading edge of the media substrate in the positive direction towards arrow 206. "Negative curl" is defined similarly in the negative direction and shown as arrow 207 in FIG. 2. Media substrate 208 is shown in FIG. 2 with a slight positive curl for illustrative purposes only. The lead edge sheet curl sensor 200 operates by measuring any time difference between an interruption of the light beams from light emitters 201 and 202 as detected at the detectors 204 and 205, just as in lead edge curl sensor 100. The output signals from the detectors 204 and 205 can be processed in a microprocessor such as that disclosed in U.S. Pat. No. 5,751,443 to Borton et al. The lead edge paper curl sensor 200 can utilize the known self calibration techniques of U.S. Pat. No. 5,751,443. It can be appreciated that the techniques and devices discussed in U.S. Pat. No. 5,751,443 are referenced herein for illustrative and edification purposes only and do not constitute limiting features of the disclosed embodiments. It can be appreciated that other types of calibration techniques can be adapted for use with alternative embodiments.

Figure 3:
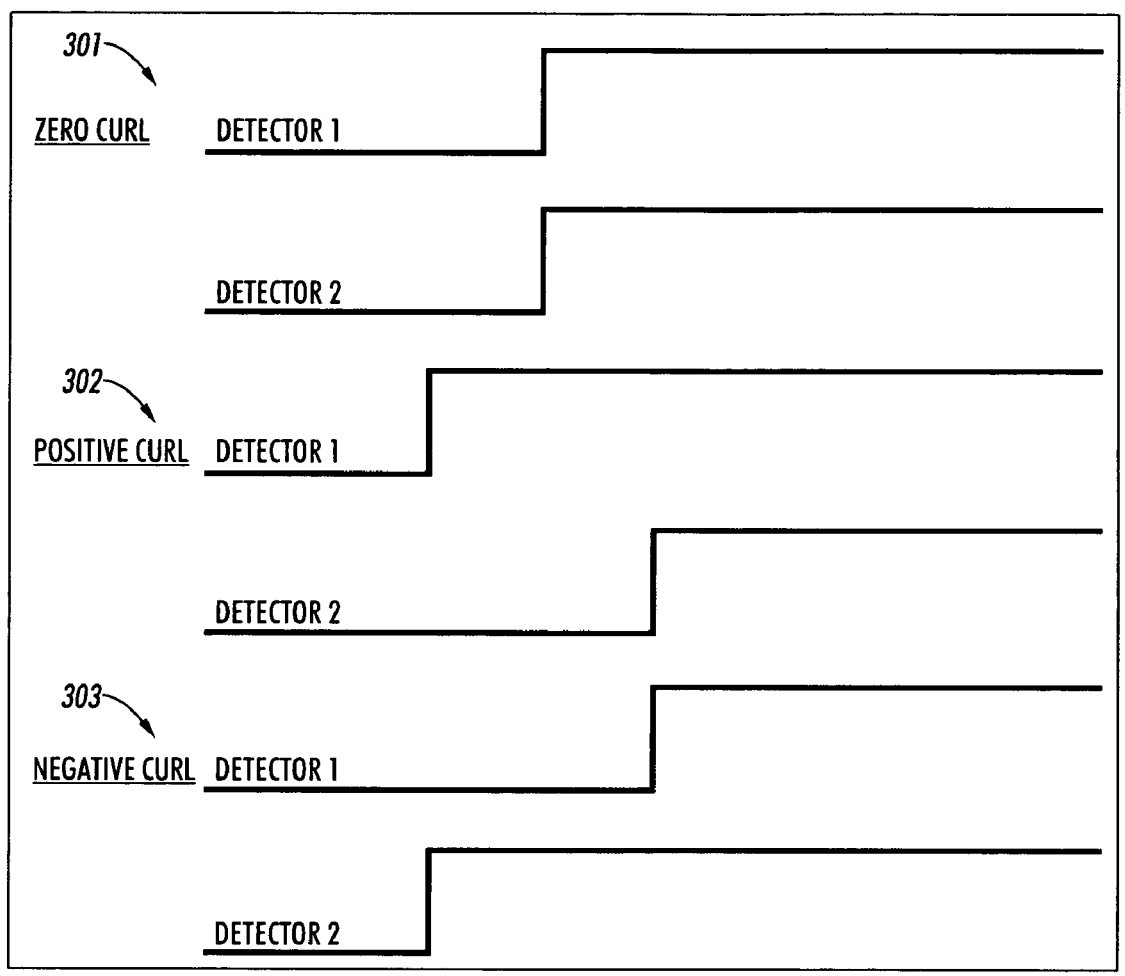
FIG. 3 illustrates a graph of the light beams received by the detectors of the sensor of FIG. 1 verses time, in accordance with an embodiment.

FIG. 3 illustrates a schematic diagram of representative output signals emitted from light detectors 104 and 105 over a particular period of time as the media substrate 108 travels at a velocity of 1 meter per second through the lead edge curl sensor 100, in accordance with a preferred embodiment. Plot 301 of FIG. 3 shows an example of the output signals from detectors 104 and 105 in a condition of zero curl of the media substrate 108. The zero curl condition causes the media substrate 108 to interrupt the light beams from light emitters 101 and 102 simultaneously, resulting in a detector timer difference of zero time. Plot 302 of FIG. 3 illustrates an example of the output signal from detectors 104 and 105 in a condition of positive curl of the media substrate 108. The positive curl condition causes the media substrate 108 to interrupt the light beams from light emitter 101 first and light emitter 102 second, resulting in a measurable time difference in the light detector output signals. Similarly, plot 303 of FIG. 3 depicts the negative curl condition, wherein the downward leading edge curl of the media substrate 108 causes the light beam of emitter 102 to be interrupted first followed by interruption of the light beam of light emitter 101. A schematic diagram of representative output signals from light detectors 204 and 205 in lead edge curl sensor 200 would be similar to those in FIG. 3.

Figure 4:
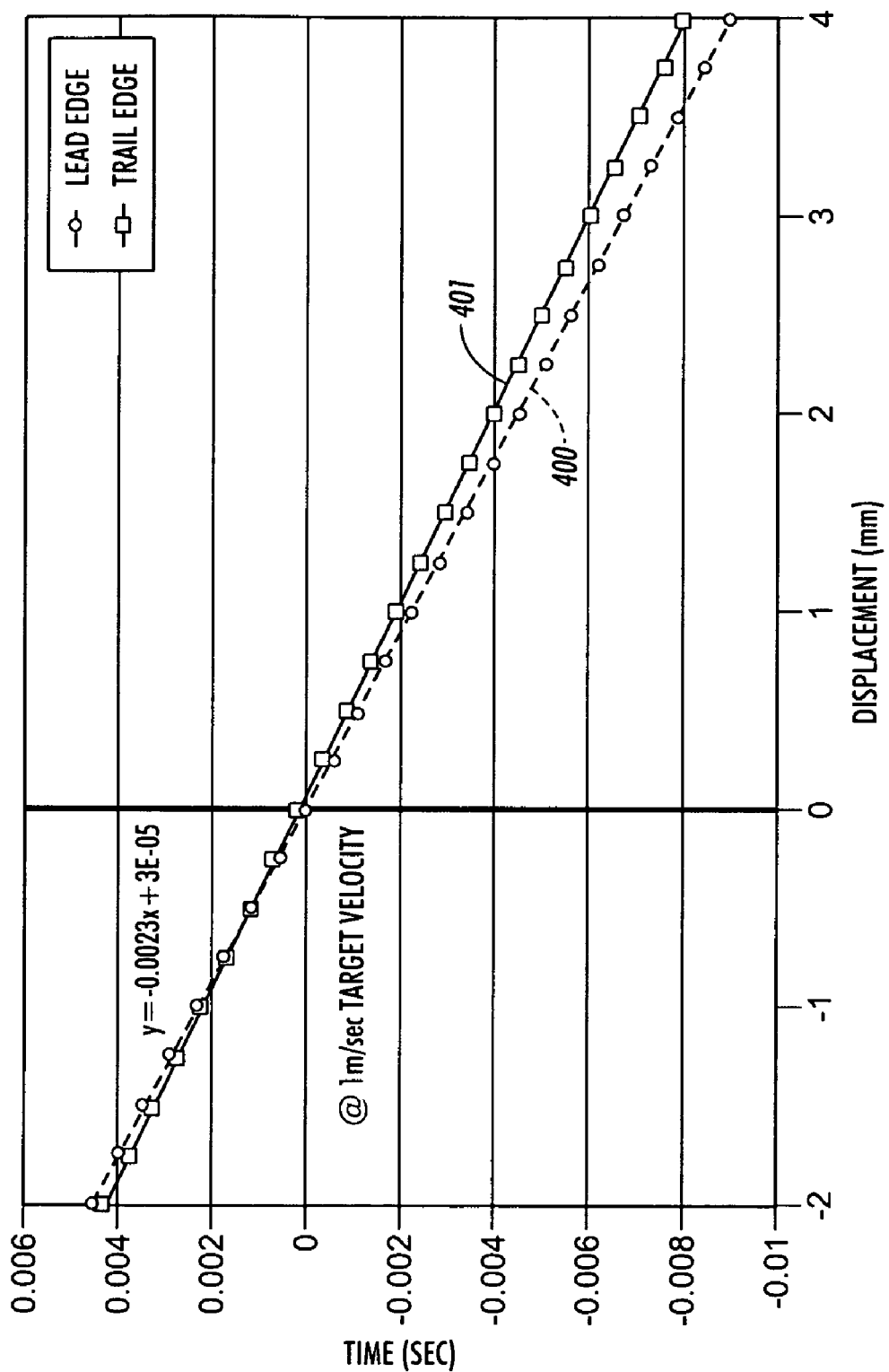
FIG. 4 illustrates a plot of time verses displacement of the lead edge and trail edge of paper in the sensor disclosed, in accordance with an embodiment.

FIG. 4 illustrates an example of test data provided by a lead edge curl sensor 100 wherein the light emitter beams cross the media transport media path 103 at approximately an angle of 45 degrees, in accordance with a preferred embodiment. In FIG. 4, plot 400 indicates the linear function of the measurement of the time differences between the light beams interrupted by the media substrate 108 and the linear displacement of the leading edge of the substrate. Plot 401 indicates the measurement of time differences between the light beams interrupted by the media substrate 108 and the displacement of the media substrate trailing edge.

The alignment of the light beams from light emitters 101 and 102 wherein the beams cross exactly at the ideal media transport path 103 would be the condition requiring no further calibration. However, the slight misalignment of the light emitters may be calibrated out by using a reference delay time between the signals, achieving the maximum media substrate curl resolution even with slightly misaligned light emitter beams. Additionally, reduction of stray light and shaping of the beams can improve signal to noise ratio at the light detectors 104 and 105 by increasing the "on" to "off" detector contrast.

Figure 5:
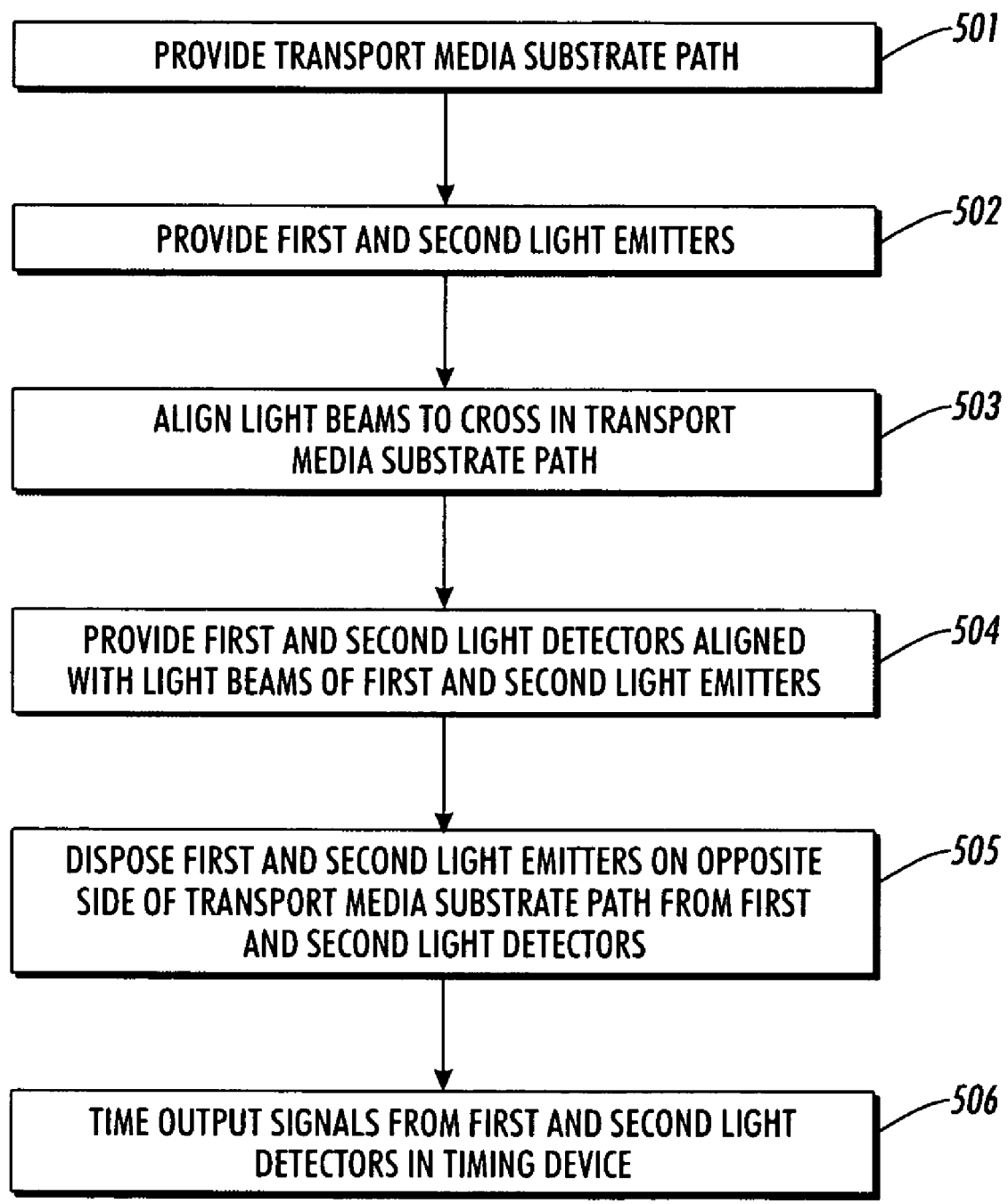
FIG. 5 illustrates a flow chart depicting a method of sensing the lead edge sheet curl, which can be implemented in accordance with a preferred embodiment.

FIG. 5 illustrates a flow chart for a lead edge sheet curl sensing method. First, a transport media sheet substrate path is provided, as shown in block 501. Next, first and second light emitters are provided, as depicted in block 502. Block 503 shows the step of aligning the light beams of the first and second light emitters so that the light beams cross at the transport media sheet path. The next step is shown in block 504 as the step of providing first and second light detectors aligned with the first and second light emitters. The first and second light emitters are disposed on opposite respective sides of the transport media sheet substrate path from the first and second light detectors, as shown in block 505. The final step comprises timing the output signals from the first and second light detectors in a timing device (e.g., a microcontroller, microprocessor or other timing device) such that the time differential of the output signals is proportional to the lead edge sheet positive or negative curl, as shown in block 506, thereby providing for a lead edge sheet curl sensing method.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A lead edge sheet curl sensor apparatus, comprising:
    a transport media sheet substrate path, wherein said transport media sheet substrate path is a path of a media sheet substrate with zero curl;
    a first light emitter and a second light emitter aligned with said first emitter, wherein light beams emitted from said first light emitter and said second light emitter cross one another;
    a first light detector aligned to receive said light beams from said first light emitter in association with a second light detector wherein said second light detector is aligned to receive said light beams from said second light emitter; and
    a timing device, wherein said first and second light detectors provide output signals representative of interruptions of said light beams by said media sheet substrate to said timing device thereby providing for a lead edge sheet curl sensor apparatus.

2. The apparatus of claim 1 wherein said light beams cross in said transport media sheet substrate path.

3. The apparatus of claim 1 wherein said first and second light emitters are disposed on respective opposite sides of said transport media sheet substrate path from said first and second light detectors.

4. The apparatus of claim 3 wherein said light beams cross in said transport media sheet substrate path, and wherein a media sheet substrate with zero curl on a lead edge of said media sheet substrate interrupts said light beams from said first and second light emitters approximately simultaneously.

5. The apparatus of claim 4 wherein said media sheet substrate with either a positive curl or a negative curl on said lead edge of said sheet substrate interrupts said light beams from said first and second light emitters, as detected at said first and second light detectors, with a time delay between said light beam interruptions.

6. The apparatus of claim 5 further comprising:
a microprocessor for processing said output signals; and
wherein said output signals are timed by said timing device such that said time delay between said output signals is proportional to a height of said positive curl or negative curl on said lead edge of said media sheet substrate.

7. The apparatus of claim 6 wherein said light beams from first and second light emitters each cross said transport media path at approximately 45 degrees.

8. A lead edge sheet curl sensor apparatus, comprising:
a first light emitter and a second light emitter aligned with said first emitter, wherein light beams emitted from said first light emitter and said second light emitter cross one another;
a first light detector aligned to receive said light beams from said first light emitter in association with a second light detector wherein said second light detector is aligned to receive said light beams from said second light emitter; and
a timing device, wherein said first and second light detectors provide output signals representative of light beam interruption to said timing device, thereby providing for a lead edge sheet curl sensor apparatus.

9. The apparatus of claim 8 wherein said first and second light emitters are disposed on respective opposite sides of a transport media sheet substrate path from said first and second light detectors wherein said transport media sheet substrate path is a path of a media sheet substrate with zero curl.

10. The apparatus of claim 9 wherein a media sheet substrate with zero curl on a lead edge of said media sheet substrate interrupts said light beams from said first and second light emitters approximately simultaneously.

11. The apparatus of claim 10 wherein said light beams cross in said transport media sheet substrate path.

12. The apparatus of claim 11 wherein said media sheet substrate with either a positive curl or a negative curl on said lead edge of said media sheet substrate interrupts said light beams from said first and second light emitters, as detected at said first and second light detectors, with a time delay between said light beam interruptions.

13. The apparatus of claim 12 wherein said first light emitter is disposed on the respective opposite side of said transport media sheet substrate path from said second light emitter.

14. The apparatus of claim 12 wherein said first light emitter is disposed on the same respective side of said transport media substrate path as said second light emitter.

15. The apparatus of claim 12 wherein said output signals are timed such that a time differential between said output signals is proportional to a height of said positive curl or negative curl on said lead edge of said media sheet substrate.

16. The apparatus of claim 13 wherein said output signals are timed such that a time differential between said output signals is proportional to a height of said positive curl or negative curl on said lead edge of said media sheet substrate.

17. A lead edge sheet curl sensing method, comprising:
measuring a time difference between interruptions of at least two transmission beams disposed to cross each other; and
determining an amount of lead edge curl based on said time difference.

18. The method of claim 17 wherein said at least two transmission beams comprise light beams.

19. The method of claim 17 wherein said at least two transmission beams cross each other at a position of zero curl.

20. The method of claim 17 wherein said at least two transmission beams cross each other at a transport media sheet substrate path.

* * * * *